H. P. KRAFT.
INFLATING COUPLING.
APPLICATION FILED NOV. 4, 1915.
1,304,576.
Patented May 27, 1919.
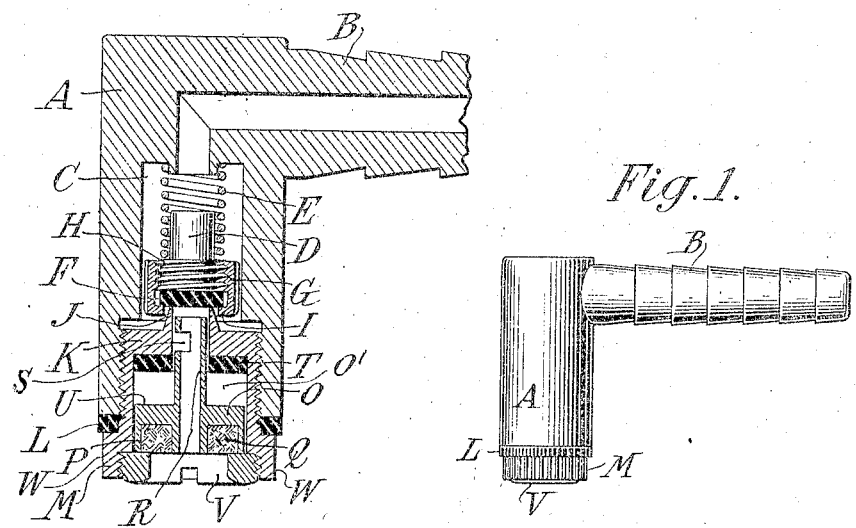
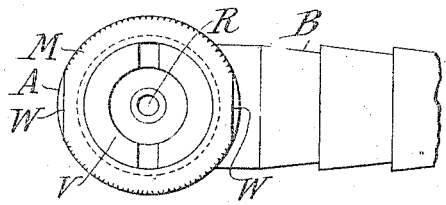
WITNESS:
Rene Quine
INVENTOR
Henry P. Kraft,
By Attorneys,
Fraser, Durk & Myers

UNITED STATES PATENT OFFICE.

HENRY P. KRAFT, OF RIDGEWOOD, NEW JERSEY.

INFLATING-COUPLING.

1,304,576.   Specification of Letters Patent.   Patented May 27, 1919.

Application filed November 4, 1915. Serial No. 59,603.

*To all whom it may concern:*

Be it known that I, HENRY P. KRAFT, a citizen of the United States of America, residing in Ridgewood, in the county of Bergen and State of New Jersey, have invented certain new and useful Improvements in Inflating-Couplings, of which the following is a specification.

This invention relates to inflating couplings, and aims to provide certain improvements therein.

The invention is particularly directed to that type of coupling which is adapted for use in connection with air tanks for filling pneumatic tire valves, the coupling being at the end of a flexible tube, and being designed to be pressed down over the tire valve to make a tight joint therewith. The act of pressing down the coupling opens a valve within the coupling which permits air from the tank to flow through the tire valve into the tire. The removal of the coupling automatically closes such valve. The invention provides a coupling, the working parts of which are easily accessible for repairs, and which is economical to manufacture.

Referring to the drawings, which illustrate one form of the invention,—

Figure 1 is an elevation of the coupling.

Fig. 2 is a diametrical section on an enlarged scale.

Fig. 3 is a bottom plan.

Referring to the drawings, let A indicate the casing or body of the coupling which is shown as formed with a right angled branch B formed as a nipple designed to be inserted in the end of the flexible hose or air tube leading from the tank. The body portion A is formed with a valve chamber C in which works a valve proper D preferably pressed outwardly by a spring E. The valve proper is provided with a packing F which it carries on the outer face thereof, and in order to hold the packing in place and prevent its spreading while at the same time providing an easy means of replacement I utilize a screw-threaded sleeve G which engages a threaded portion H formed on the valve proper. The sleeve G is formed with a flange I which engages the packing washer F, and holds it securely in place.

The valve proper D is adapted to make contact with the valve seat J which is formed on a seat member K, the latter being provided with a screw-thread which engages a similar thread formed in the upper part of the coupling body. In order to secure a tight joint the packing L is provided which is forced against the outer part of the coupling body by a flange M formed on the seat member K.

The valve D is opened by a valve opener O which moves in a recess O' formed in the seat member K, the upper part of which is formed with a recess P in which is secured a packing washer Q, which packing washer is adapted to bear against the end of the tire valve casing, and form a tight joint therewith.

As the valve opener is pressed inwardly by the tire valve, it bears against the coupling valve D and opens this against its spring E. In the construction shown the valve opener is provided with a tubular projection R which passes inwardly through the valve seat J and presses the valve open. A lateral passage S in the projection R permits air to flow from the valve chamber through the bore of the projection into the tire valve, where its pressure unseats the check or valve proper of the latter.

As the valve opener O is pressed inwardly by the tire valve, it makes contact with a packing ring T, the valve opener O having a shoulder, such as U, to engage the packing. This prevents any leakage around the valve opener into the outer air, and compels the air to flow through the lateral passage S into the valve opener, and thence into the tire.

In order to prevent the valve opener from escaping from the seat member, I prefer to provide a guard ring or stop V, which is screwed in the upper end of the seat member, as shown.

The construction just described is very easily accessible. In order to remove the interior parts, it is only necessary to unscrew the seat member (which may be provided with flats W W for this purpose), whereupon the valve opener is removed with the seat member, and the valve D with its spring E easily dropped out. In order to remove the valve opener from the valve seat member, the stop ring V may be unscrewed, whereupon the valve opener may be removed and inspected or repaired, and the packing T may be also removed and another substituted for it if desired.

While I have shown and described one form of the invention, it will be understood that I do not wish to be limited thereto, since various changes may be made therein without departing from the invention.

What I claim is:—

1. A device of the character described having a body portion, a seat member screwing into the end of said body portion, a valve member inwardly of said seat member, a valve unseating member formed separately from the seat member and having a projection passing through said seat and adapted to open said valve, a packing carried by said valve unseating member adapted to make a tight joint with the top of a tire valve casing, and a packing between said seat member and valve unseating member adapted to make a tight joint between the two when the valve unseating member is pushed inwardly by the tire valve.

2. A device of the character described comprising a body portion having a valve chamber, a valve in said valve chamber, a spring for pushing said valve outwardly, a seat member outwardly of said valve chamber and having a valve seat extending inwardly toward said valve, a screw-threaded bore in said body portion adapted to receive said seat member, a flange on said seat member, a packing between said flange and said body portion, an unseating device having a hollow projection extending through said seat, said unseating device movable along the interior of said seat member, a packing carried by said unseating device adapted to make a tight joint with the top of a valve casing, a packing between said unseating device and said seat member adapted to make a tight joint between the two when said unseating device is pushed inwardly by the entering valve casing, and means for retaining said unseating device within the seat member.

3. A device of the character described having a valve chamber, a valve in said chamber having a screw-threaded portion, a packing beyond said screw-threaded portion, a threaded sleeve screwing on said screw-threaded portion and having a flange adapted to engage said packing, a seat member adapted to screw into said body portion, an unseating device having a hollow projection extending through said seat, a packing in said unseating device, and a packing between said unseating device and said seat member.

4. An inflating coupling for pneumatic tires comprising a casing having a body portion and a seat member entering such body portion, the body portion having a valve chamber, an outwardly seating valve in said chamber, said seat member formed with a valve seat for said valve, a valve unseating member movable through said seat member, a yielding packing at the outlet end of the casing adapted to form a packed joint with an applied tire valve and to be moved inward by pressure therefrom, and said valve unseating member adapted to be displaced by such movement and thereupon unseat said valve, whereby the removal of said seat member gives access to the valve chamber and valve.

5. An inflating coupling according to claim 4, having at the outlet from the seat member a retaining means for said packing and unseating member.

6. An inflating coupling according to claim 4, having at the outlet end of its seat member a retaining ring whereby said packing and unseating member are confined in and removable with the seat member.

7. A device of the character described comprising a body portion, a hollow seat member screwing into the end of the body portion, and having its inner end provided with a seat, an unseating member having a part adapted to contact with a valve, and having a projection passing through the seat, means for retaining the unseating member in the seat member, and a valve arranged inwardly of the seat member and formed separately therefrom, said valve being adapted to be moved by the projection on the unseating member when the device is applied to a valve.

In witness whereof I have hereunto signed my name in the presence of two subscribing witnesses.

HENRY P. KRAFT.

Witnesses:
E. V. MYERS,
FRED WHITE.